(12) United States Patent
Golde et al.

(10) Patent No.: US 8,806,604 B2
(45) Date of Patent: Aug. 12, 2014

(54) METHODS FOR FIREWALL PROTECTION OF MASS-STORAGE DEVICES

(75) Inventors: Ittai Golde, Rishon Lezion (IL); Alexander Paley, Kfar Saba (IL); Leonid Shmulevich, Rehovot (IL)

(73) Assignee: SanDisk IL Ltd., Kfar Saba (IL)

( * ) Notice: Subject to any disclaimer, the term of this patent is extended or adjusted under 35 U.S.C. 154(b) by 1200 days.

(21) Appl. No.: 11/769,760

(22) Filed: Jun. 28, 2007

(65) Prior Publication Data

US 2008/0250488 A1 Oct. 9, 2008

Related U.S. Application Data

(60) Provisional application No. 60/910,708, filed on Apr. 9, 2007.

(51) Int. Cl.
*G06F 15/16* (2006.01)
(52) U.S. Cl.
USPC ............. 726/11; 726/9; 726/22; 713/182; 345/163; 710/36; 710/74; 710/110; 700/94; 381/58

(58) Field of Classification Search
USPC ............. 726/11, 22, 9; 713/182; 345/163; 710/36, 74, 110; 700/94; 381/58
See application file for complete search history.

(56) References Cited

U.S. PATENT DOCUMENTS

| 6,654,817 | B1 | 11/2003 | Huang |
| 6,907,533 | B2 * | 6/2005 | Sorkin et al. .................. 726/22 |
| 7,490,350 | B1 * | 2/2009 | Murotake et al. ............. 726/11 |
| 7,632,113 | B2 | 12/2009 | Finn |
| 2004/0232247 | A1 | 11/2004 | Tsunoda et al. |
| 2005/0083968 | A1 | 4/2005 | Chan |
| 2005/0149213 | A1 * | 7/2005 | Guzak et al. .................. 700/94 |
| 2005/0246547 | A1 * | 11/2005 | Oswald et al. ................ 713/182 |
| 2006/0007151 | A1 * | 1/2006 | Ram ............................. 345/163 |
| 2006/0294249 | A1 | 12/2006 | Oshima et al. |
| 2008/0082714 | A1 | 4/2008 | Hinchey |

FOREIGN PATENT DOCUMENTS

| JP | 2006-114048 A1 | 4/2006 |
| TW | M261812 | 4/2005 |
| WO | WO 98/55911 | 12/1998 |
| WO | 2004/054185 A1 | 6/2004 |
| WO | WO 2005/050384 | 6/2005 |
| WO | WO 2006/090393 | 8/2006 |

OTHER PUBLICATIONS

"Product review: Block unauthorized personal computer device access with deviceLock". Internet citation—URL: http://articals.techrepublic.com.com/5100-10878-11-5084802.html.

(Continued)

*Primary Examiner* — Thanhnga B Truong
(74) *Attorney, Agent, or Firm* — Brinks Gilson Lione

(57) ABSTRACT

The present invention discloses methods for protecting a host system from information-security risks posed by a URD, the method including the steps of: operationally connecting the URD to the host system; communicating, between the URD and the host system, via a network protocol, through a firewall residing in the host system; and configuring said firewall to provide security measures related to the URD. Preferably, the firewall is a software firewall or a hardware firewall. A method for protecting a host system from information-security risks posed by a URD, the method including the steps of: operationally connecting the URD to the host system; communicating, between the URD and the host system, via a network protocol, through a firewall residing in the host system; and configuring said firewall to restrict access of at least one application to the URD. Preferably, the firewall is a software firewall or a hardware firewall.

11 Claims, 3 Drawing Sheets

(56) References Cited

OTHER PUBLICATIONS

Office Action issued in U.S. Appl. No. 11/769,757, mailed Sep. 8, 2010 (7 pages).
International Search Report issued in international application No. PCT/IL2008/000473, mailed Sep. 16, 2008 (7 pages).
International Written Opinion issued in international application No. PCT/IL2008/000473, mailed Sep. 16, 2008 (7 pages).
Reduced Block Commands, Revision 10a, Aug. 18, 1999 (47 pages).
Universal Serial Bus Specification, Mass Storage Class, UFI Command Specification, Revision 1.0, Dec. 14, 1998 (53 pages).
Universal Serial Bus Specification, Revision 1.1, Chapter 8, Sep. 23, 1998 (30 pages).
Taiwanese Office Action and Search Report issued in Taiwanese patent application No. 097112662, issued Nov. 21, 2011 (13 pages including translation).
Office Action issued in Japanese patent application No. 2010-502634 dated Feb. 28, 2012 (8 pages with English translation).
Examination Report issued in European application No. 08738177.8 on Nov. 11, 2011 (7 pages).
Notice of Allowance issued in Japanese application No. 2010-502634, dated Jan. 22, 2012 (3 pages).
Office Action issued in Chinese application No. 2008800148904, dated Aug. 5, 2013 (7 pages).
Official Communication issued in European application No. 08738177.8, dated Oct. 18, 2013 (17 pages).
Search Report issued in Taiwanese application No. 097112662, dated Nov. 17, 2011 (1 page).

\* cited by examiner

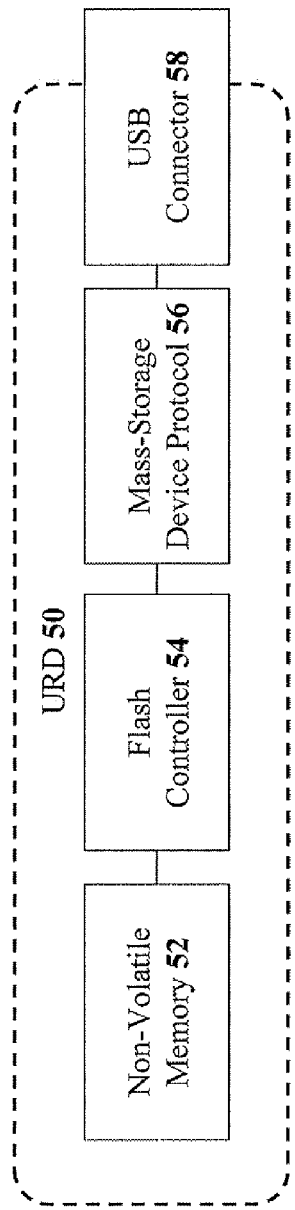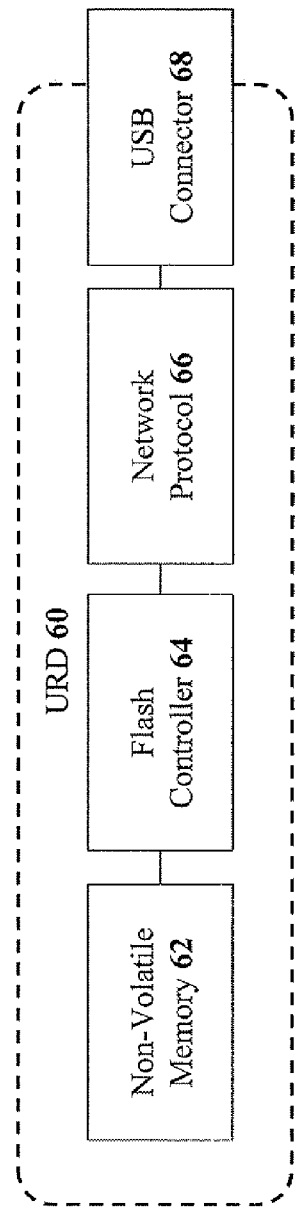
Prior Art
Figure 2A
Figure 2B

METHODS FOR FIREWALL PROTECTION OF MASS-STORAGE DEVICES

RELATED APPLICATIONS

This patent application claims priority under 35 U.S.C. §119(e) to U.S. Provisional Application No. 60/910,708, filed Apr. 9, 2007, which is hereby incorporated by reference in its entirety.

This patent application is related to U.S. patent application Ser. No. 11/769,757 of the same inventors, which is entitled "METHODS FOR FIREWALL PROTECTION OF MASS-STORAGE DEVICES" and filed on the same day as the present application. This patent application, also claiming priority to U.S. Provisional Application No. 60/910,708, is incorporated in its entirety as if fully set forth herein.

FIELD AND BACKGROUND OF THE INVENTION

The present invention relates to methods for protecting a host system from information-security risks posed by mass-storage devices by routing communication through a network protocol, and by applying a firewall.

USB flash drives (UFDs) are well-known devices for providing portable data storage. UFDs are typically configured to be interchangeably connected to multiple computers. Because of this feature, UFDs pose an inherent information-security risk to a host computer. Such a risk necessitates implementation of security measures.

The prior art offers a variety of security measures for protecting host computers from risks associated with portable data-storage devices. Examples of such security measures include anti-virus programs and the mTrust solution (available from SanDisk IL Ltd., Kefar Saba, Israel).

The prior-art solutions suffer from inherent limitations that reduce their value. The prior art is typically configured to handle only one type of security risk. Anti-virus tools are typically limited to deal only with viruses, while mTrust-type solutions are limited to address risks associated primarily with access control.

It would be desirable to have an information-security system for protecting a host system from a broad array of information-security risks posed by a UFD security, while complying with the information-security policy of the host-system user.

SUMMARY OF THE INVENTION

It is the purpose of the present invention to provide methods for protecting a host system from information-security risks posed by mass-storage devices by routing communication through a network protocol, and by applying a firewall.

For the purpose of clarity, several terms which follow are specifically defined for use herein. The term "network protocol" is used herein to refer to a communication protocol from the network layer of an OSI (Open Systems Interconnection) network architecture, and more specifically herein, the internet protocol (IP). The terms "USB removable drive" and "URD" are used herein to refer to a removable drive that has a non-volatile storage memory and a controller. A UFD is a special type of URD in which flash memory is utilized.

The term "traffic" is used herein to refer to activity over a communication system during a given period of time. The terms "demilitarized zone" and "DMZ" are used herein to refer to a part of a network that is neither part of the internal network, nor directly part of the internet. The term "firewall" is used herein to refer to a gateway that limits access between networks in accordance with local access-security policies.

The present invention teaches systems, and methods for implementing such systems, that reside in a URD, and emulate a network drive for a host system. The network-drive emulation is performed by changing firmware residing in the URD controller, and by enabling the URD as a network device on the Microsoft™ Windows™ operating system (OS). The URD is identified as a network device, and can be accessed by various file-access protocols (e.g. HTTP, FTP, and SMB). The network device is designated by a drive letter or as a file server (as is well-known in the art of computer engineering, and integrated in the Windows OS).

Network drives are common devices for protecting using ordinary firewall systems (e.g. McAfee Personal Firewall, available from McAfee Corporation, Sunnyvale, Calif.). Once the host system, equipped with a firewall, detects a storage device as a network storage device, the host system applies all the pertinent rules of the associated firewall, thereby protecting the host system from attacks such as unauthorized access.

Therefore, according to the present invention, there is provided for the first time a method for protecting a host system from information-security risks posed by a URD, the method including the steps of: (a) operationally connecting the URD to the host system; (b) communicating, between the URD and the host system, via a network protocol, through a firewall residing in the host system; and (c) configuring said firewall to provide security measures related to the URD.

Preferably, the firewall is a software firewall or a hardware firewall.

According to the present invention, there is provided for the first time a method for protecting a host system from information-security risks posed by a URD, the method including the steps of: (a) operationally connecting the URD to the host system; (b) communicating, between the URD and the host system, via a network protocol, through a firewall residing in the host system; and (c) configuring said firewall to restrict access of at least one application to the URD.

Preferably, the firewall is a software firewall or a hardware firewall.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 2A is a simplified block diagram of a URD, according to the prior art;

FIG. 2B is a simplified block diagram of a URD, according to preferred embodiments of the present invention;

DESCRIPTION OF THE PREFERRED EMBODIMENTS

The present invention relates to methods for protecting a host system from information-security risks posed by mass-storage devices by routing communication through a network protocol, and by applying a firewall. The principles and operation for protecting a host system from information-security risks posed by mass-storage devices, according to the present invention, may be better understood with reference to the accompanying description and the drawings.

Figure 1:
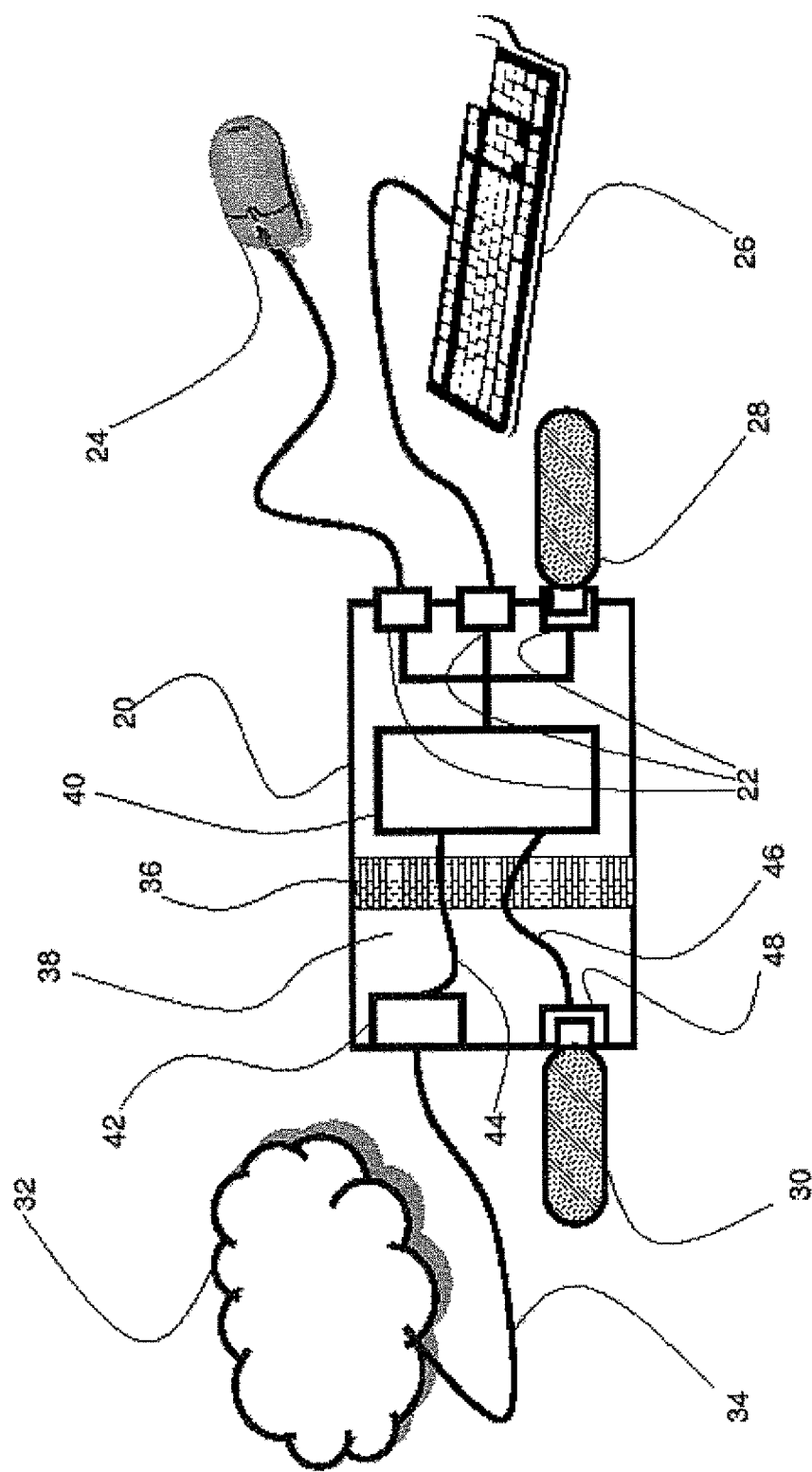
FIG. 1 is a simplified block diagram of a host system having firewall protection from a mass-storage device, according to preferred embodiments of the present invention.

Referring now to the drawings, FIG. 1 is a simplified block diagram of a host system having firewall protection from a mass-storage device, according to preferred embodiments of the present invention. A host system 20, having three USB connectors 22 is shown in FIG. 1. A USB mouse 24, a USB keyboard 26, and a URD 28 are shown each operationally connected to one connector 22. A network 32 (e.g. a local-area network and the Internet) is accessible via a network connection 34.

Host system 20 is equipped with a firewall 36. Firewall 36 can be a software firewall (e.g. MacAfee Personal Firewall), or a hardware firewall (e.g. Cisco PIX Firewall 515E available from Cisco, San Jose, Calif.). The area beyond firewall 36, typically called a DMZ 38, serves to connect host system 20 with the external world. Traffic from the peripherals (i.e. USB mouse 24, USB keyboard 26, and URD 28) flows into a CPU 40. Connection of host system 20 with the external world is typically performed via a network card 42, operationally connected to network connection 34, and ultimately to network 32. The functionality of firewall 36 in protecting host system 20 from unauthorized access is well-known in the art, and is not described herein.

An essential feature of the present invention is the connection of a local peripheral 30, typically a URD or other mass-storage device, to DMZ 38 of host system 20. Such a configuration requires that peripheral 30 be recognized by host system 20 as a network device, and not as a mass-storage device (such as URD 28). In such a configuration, systems of the present invention require URD 30 to meet the requirements of the security features of firewall 36, which are strong and well-maintained.

To summarize, there are two differences between a URD (e.g. URD 28) connected directly to host system 20, and a URD (e.g. 30) connected to DMZ 38:
(1) the communication protocol—URD 28 is a mass-storage class device, while peripheral 30 is a simulated network device; and
(2) the level of security of host system 20 from device-related risks host system 20 does not have any security measures against URD 28, but has full firewall protection against peripheral 30.

FIG. 2A is a simplified block diagram of a URD, according to the prior art. A URD 50, having a non-volatile storage memory 52, a flash controller 54, a mass-storage class protocol 56, and a USB connector 58, is shown in FIG. 2A. Data is written and read via USB connector 58, and encoded via mass-storage class protocol 56. Flash controller 54 encodes and decodes the data provided from mass-storage class protocol 56, and writes the data to storage memory 52.

FIG. 2B is a simplified block diagram of a URD, according to preferred embodiments of the present invention. A URD 60, having a non-volatile storage memory 62, a flash controller 64, a network protocol 66, and a USB connector 68, is shown in FIG. 2B. Data is written and read via USB connector 68, and encoded via network protocol 66. Flash controller 64 encodes and decodes the data provided from network protocol 66, and writes the data to storage memory 62. Clearly, systems according to the present invention enable firewall security measures to be applied to URD 60.

Figure 3:
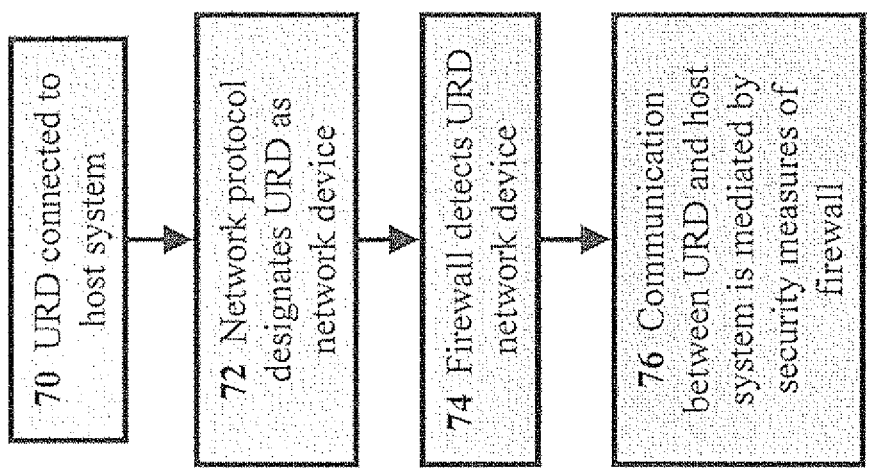
FIG. 3 is a simplified flowchart of the operation of a host system having firewall protection from a mass-storage device, according to preferred embodiments of the present invention.

FIG. 3 is a simplified flowchart of the operation of a host system having firewall protection from a mass-storage device, according to preferred embodiments of the present invention. A URD is operationally connected to the host system (Step 70). A network protocol of the URD designates the URD as a network device on the host system (Step 72). A firewall residing in the host system detects the URD network device (Step 74). Communication between the URD and the host system is mediated by security measures of the firewall (Step 76). It is noted that the firewall can also be configured to restrict access of a specific application to the URD.

While the invention has been described with respect to a limited number of embodiments, it will be appreciated that many variations, modifications, and other applications of the invention may be made.

What is claimed is:

1. A method for protecting a host system from information-security risks posed by a USB removable drive (URD), the method comprising:
in a URD having a non-volatile memory in communication with a controller, while there is a local physical connection of the URD to the host system, the controller:
identifying, via communication over a network protocol, the URD to the host system as a network drive rather than as a local mass storage device;
communicating with the host system, via the network protocol, through a firewall residing in the host system; and
decoding data from the host system with the network protocol and writing the data to the non-volatile memory in the URD, wherein the controller of the URD causes the host system to enable firewall security measures of the firewall via communications over the network protocol rather than a mass storage protocol.

2. The method of claim 1, wherein the firewall is a software firewall.

3. The method of claim 1, wherein the firewall is a hardware firewall.

4. The method of claim 1, wherein the communicating comprises communicating responsive to security measures of said firewall.

5. The method of claim 4, wherein the communicating further comprises receiving restricted access to at least one application on the host system.

6. The method of claim 1, wherein communicating via the network protocol comprises communicating via Internet Protocol.

7. A USB removable drive (URD) comprising:
a non-volatile storage memory;
a USB connector; and
a controller in communication with the non-volatile storage memory, the controller configured to:
control operations performed on the non-volatile storage memory; and
present the URD to a host system as a network drive via transmission of data in a network protocol over the USB connector, rather than a mass storage protocol, wherein the controller of the URD enables communication with the host through a firewall residing in the host system.

8. The URD of claim 7, wherein the non-volatile storage memory includes flash memory.

9. The URD of claim 7, wherein the network protocol comprises Internet Protocol.

10. The URD of claim 7, wherein the controller comprises firmware executable to present the URD to the host system as a network drive.

11. The URD of claim 9, wherein the controller is further configured to decode data from the host system with the network protocol and write the data to the non-volatile storage memory in the URD.

* * * * *